United States Patent [19]

Natori

[11] E Re. 28,897

[45] Reissued July 13, 1976

[54] MOTION TRANSFORMING MECHANISM

[75] Inventor: Machito Natori, Matsumoto, Japan

[73] Assignees: Kabushiki Kaisha Suwa Seikosha; Shinshu Seiki Kabushiki Kaisha, both of Tokyo, Japan

[22] Filed: Apr. 10, 1975

[21] Appl. No.: 567,227

Related U.S. Patent Documents

Reissue of:

[64] Patent No.: 3,818,773
Issued: June 25, 1974
Appl. No.: 378,357
Filed: July 11, 1973

[52] U.S. Cl. ..... 74/112; 74/30; 197/114 R; 197/133 R

[51] Int. Cl.[2] ..... F16H 27/00

[58] Field of Search ..... 74/112, 30, 31; 197/114, 133, 139

[56] References Cited

UNITED STATES PATENTS

| | | | |
|---|---|---|---|
| 3,217,855 | 11/1965 | Haberkorn et al. | 197/114 R |
| 3,217,856 | 11/1965 | Miles | 197/114 R |
| 3,292,762 | 12/1966 | Erickson | 197/114 R |
| 3,313,390 | 4/1967 | Curtis | 197/133 R |
| 3,448,639 | 6/1969 | Adler | 74/112 |
| 3,495,693 | 2/1970 | Limberger | 74/112 |
| 3,534,847 | 10/1970 | Willcox | 197/114 R |

*Primary Examiner*—Samuel Scott
*Assistant Examiner*—Wesley S. Ratliff, Jr.
*Attorney, Agent, or Firm*—Blum, Moscovitz, Friedman & Kaplan

[57] ABSTRACT

A motion-transformer suitable for use with a small printing machine utilizes a trigger mechanism in combination with a rotating drum and slidable members to convert the rotation of the drum into linear motion. The linear motion provides for intermittent advancement of paper on which printing is to be carried out.

7 Claims, 4 Drawing Figures

MOTION TRANSFORMING MECHANISM

Matter enclosed in heavy brackets [ ] appears in the original patent but forms no part of this reissue specification; matter printed in italics indicates the additions made by reissue.

BACKGROUND OF THE INVENTION

In a conventional motion transforming mechanism for converting rotating into reciprocating motion, an objective which is encountered in small printing machines, the sliding portion of the mechanism which is responsible for advancement of the paper on which text is to be printed consists of a paper-feeding lever, a rack lever which makes contact with a rotating pinion gear and a trigger portion which is moved by an electromagnet. In addition, this portion of the mechanism requires three springs which are used to return the sliding portion of the mechanism to a normal position in which the rack is disengaged from the pinion.

The trigger portion of the mechanism must engage a notch in the rack lever as the sliding mechanism is pulled back into normal position, else the system will fail to function when the electromagnet is pulsed.

The conventional mechanism is unnecessarily complex because of the fact that the sliding portion of the mechanism involves at least three portions in addition to the springs. Further, the engagement of the trigger portion with the notch in the rack lever is uncertain so that it may happen that the rack lever engages the gear at inappropriate moments during operation of the system. Also, the system is not suitable for miniaturization because of the number of members involved in carrying out the necessary operations. Finally, start-up may be difficult because the trigger portion is disengaged from the electromagnet abruptly and the rack lever may become engaged with the gear which holds a print drum.

SUMMARY OF THE INVENTION

The motion-transformer of the present invention includes a reciprocating portion which consists only of a reciprocating member and a member for engaging a rotor, usually in the form of a gear. Only two springs are necessary for returning the reciprocating portion to its normal position, and the trigger mechanism may be either an electromagnet or other timing device for pivoting the engaging member into contact with the rotor. The reciprocating member is guided by two stops which limit the excursion thereof in both directions. The engaging member is disengaged from the rotor by means of contact with a camming portion of the engaging member.

Accordingly, an objective of the present invention is to provide an improved motion-transformer.

Another object of the present invention is to provide an improved motion-transformer for converting rotation into reciprocation using a mechanism suitable for employment in a small printing machine.

A further object of the present invention is to provide an improved motion-transformer suitable for advancing paper intermittently in a small printing machine.

An important object of the present invention is to provide an improved motion-transformer of simpler construction and having fewer parts than conventional motion-transformers.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWING

For a fuller understanding of the invention, reference is had to the following description taken in connection with the accompanying drawings, in which.

DESCRIPTION OF THE PREFERRED EMBODIMENT

Figure 1:
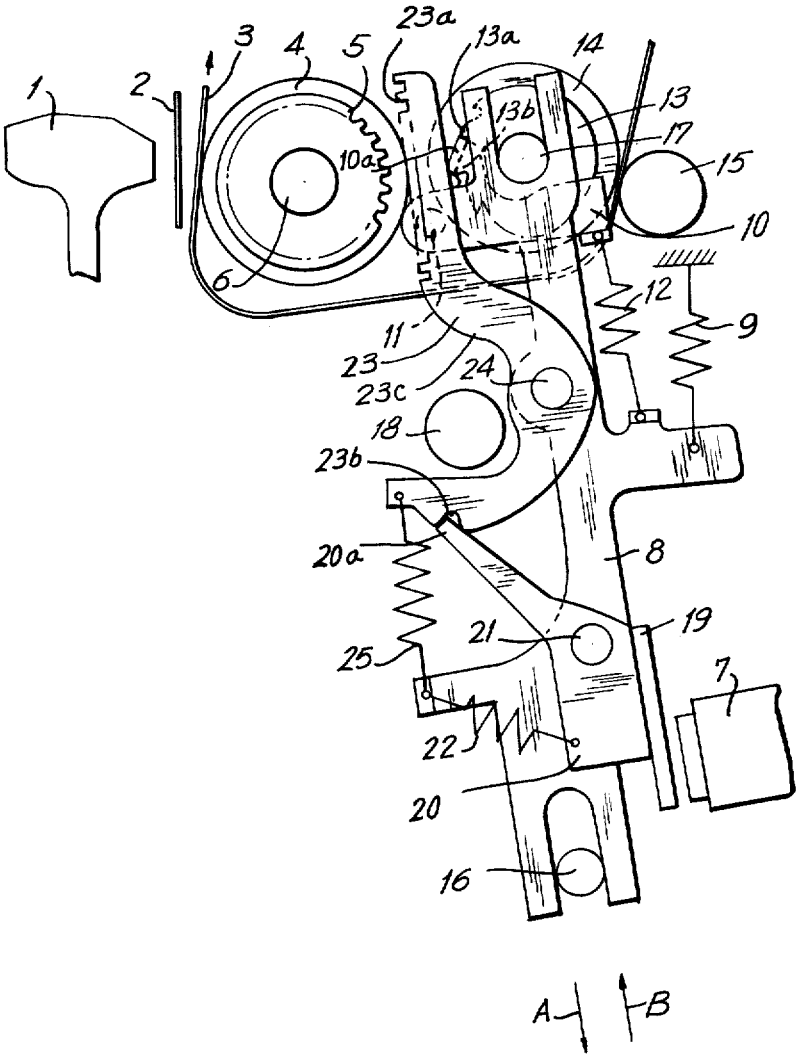
FIG. 1 PRIOR ART
FIG. 1 is a conventional motion-transformer suitable for use in a small printing machine.

A motion-transformer for converting rotation into reciprocation in a small printing machine in which the motion-transformer shown is of conventional construction is shown in FIG. 1. After the machine has printed one line of text, printed paper 3 is moved through a predetermined distance and the next line of text is printed by striking the printed paper 3 through an ink ribbon 2 against a print drum 4.

To advance the paper, a plate 19 of a material having a high magnetic susceptibility such as iron is attracted by an electromagnet 7 which is pulsed for this purpose. Rotation of electromagnet lever 20 in a clockwise direction against the pull of spring 22 disengages end 20a of electromagnet lever 20 from notch portion 23b of rack lever 23. Rack lever 23 is pivotably supported on paper feeding lever 8 by trunion 24.

When electromagnet lever end 20a is disengaged from notch 23b rack lever 23 rotates counterclockwise around trunion 24 and engages gear 5 mounted for rotation with print drum 4 on shaft 6. Gear 5 rotates continuously.

Engagement of rack 23a with gear 5 rotating in clockwise direction applies a thrust through trunion 24 to paper-feeding lever 8 in the direction indicated by the arrow identified by A. The movement of paper-feeding lever 8 is guided by shaft 17 and stop 16. Shaft 17 on which rotates paper feeding roller 14 also serves as a stop for paper-feeding lever 8 when moving in the direction indicated by the arrow labelled B.

As paper-feeding lever 8 moves in direction A, paper-feeding finger 10 which is supported on paper-feeding lever 8 by axis 11 is forced against the periphery of ratchet wheel 13 by spring 12. Pawl 10a which at the beginning of the downward stroke of paper-feeding lever 8 is resting against ratchet tooth 13a rides over the exterior of the next tooth by virtue of the fact that paper finger 10 can pivot about axis 11 until the end of pawl 10a engages ratchet tooth 13b.

Rack lever 23 has a camming portion 23c so located and so shaped that when paper-feeding lever 8 has moved in direction A far enough so that pawl 10a has advanced by one tooth on ratchet wheel 13, camming portion 23 comes in contact with stop 18 which causes rack lever 23 to rotate clockwise against the pull of spring 25, thereby disengaging rack 23a from gear 5.

In order to engage rack end 23a of paper-feeding lever 8 with gear 5, electromagnet 7 need be activated only long enough to take electromagnet lever 8 out of notch 23b. After that, spring 25 holds rack lever 23a in engagement with gear 5. Consequently, when rack lever end 23a is disengaged from gear 5 as the result of contact between camming portion 23c and stop 18, electromagnet lever end 20a can slip into notch 23b under the influence of the pull of spring 22. As aforenoted, this action is somewhat uncertain as the result of which rack lever end 23a may engage gear 5 at stages of the operation where this is not desirable. Rack lever end 23a is disengaged.

In view of the fact that electromagnet 7 is unactivated when the movement of paper-feeding lever 8 in the direction A is terminated, spring 9 is now unopposed and takes over, moving paper-feeding lever 8 in the direction indicated by the arrow labelled B, moving lever 8 until it bottoms against shaft 17. Simultaneously pawl 10a acts on ratchet tooth 13b rotating ratchet wheel 13 through an angle corresponding to the distance between ratchet teeth 13a and 13b. The direction of rotation of ratchet wheel 13 is, of course, clockwise. Rotation of ratchet wheel 13 causes corresponding rotation of roller shaft 17 and paper-feeding roller 14 which affixed to shaft 17 for rotation therewith. Roller 15 is mounted for free rotation and is pressed toward roller 14 by means which are not shown. The paper on which printing is to be carried out passes between rollers 14 and 15 and stepwise rotation of roller 14 as a result of the reciprocation of paper-feeding lever 8 causes stepwise advancement of paper 3 through the printing machine and across print drum 4 for printing thereon.

It will be noted that the reciprocating portion of the motion-transforming mechanism has three essential elements, namely the paper-feeding lever 8, the rack lever 23 and the electromagnet lever 20. Further, for operation as a motion-transformer three springs are necessary, namely springs 9, 22 and 25. The paper-feeding finger 10 and its associated spring 12 adapt the motion-transformer for use as a paper-feeding mechanism.

Figure 2:
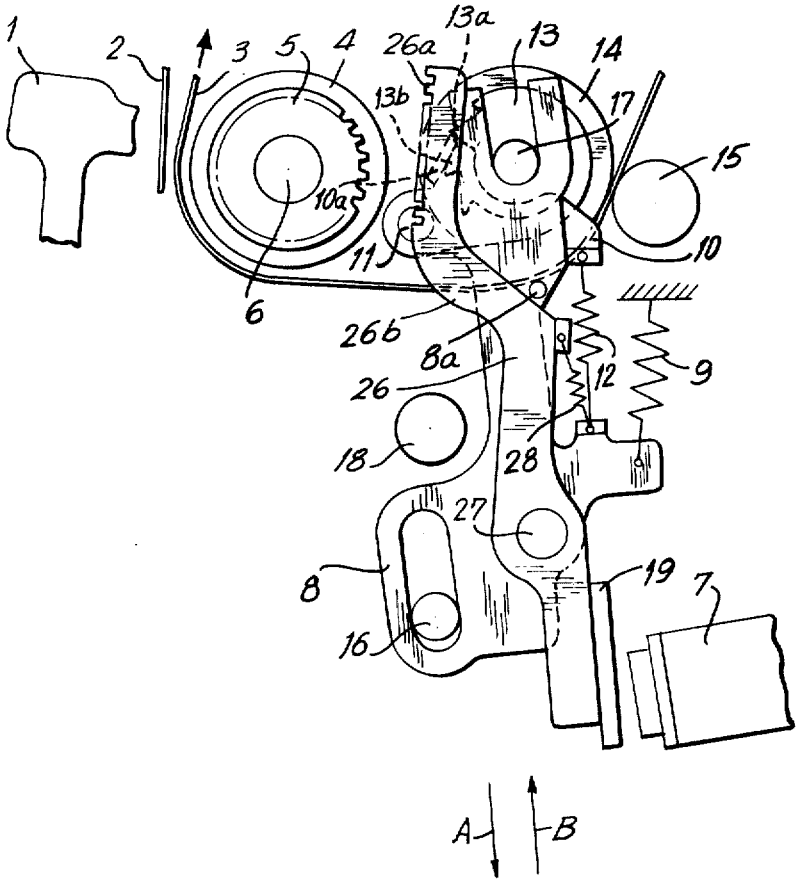
FIG. 2 is a motion-transformer in accordance with the present invention shown in position for use in a small printing machine.

As aforenoted, the embodiment of the present invention reduces the number of reciprocating elements from 3 to 2 when the device is used simply as a motion-transformer, and the number of springs from 3 to 2. The preferred embodiment is shown in FIG. 2. Operation of the system is started by applying a pulse to electromagnet 7 which draws a plate 19 toward it. Preferably, the shape of cam 26 should be such that when engaging portion 26a makes contact with rotor 35, there is clearance between plate 19 and electromagnet 7. Such clearance facilitates reciprocation of member 38.

In FIG. 2, rotor 35 is shown as a gear and engaging portion 26a is shown as a rack. However, rotor 35 and engaging portion 26a could also be the portions of a friction drive, where both rotor 35 and engaging portion 26a lack teeth. Similarly, member 7 and plate 19 could be replaced by a mechanism designed to rotate cam 26 in counterclockwise direction of a limited period of time in each cycle. The design of such a mechanism is well within the capacity of one skilled in the art.

Cam 26 is mounted on member 38 by means of trunion 27 around which it rotates freely. When electromagnet 7 is activated, cam 26 is rotated counterclockwise against the pull of spring 28 until engaging end 26a of cam 26 makes contact with rotor 35. For this rotation to take place, the moment of force supplied by electromagnet 7 and plate 19 around trunion 27 must exceed the moment of force exerted by spring 28.

Engagement of engaging portion 26a with rotor 35 drives cam 26a and consequently member 38 in the direction indicated by the arrow labelled A. Member 38 is guided by stop 16 and stop-shaft 17 where members 16 and 17 not only function as guides but as stops limiting the excursion of member 38 in each direction. The movement of cam 26 and member 38 in direction A continues until camming portion 26b of cam 26 engages stop 18. As a result of contact with stop 18, cam 26 is rotated in clockwise direction disengaging end 26a from rotor 35. This terminates the force exerted by rotor 35 on member 38 driving same in direction A and allows spring 9 to take over, drawing the reciprocatable member 38 in the direction indicated by the arrow labelled B. Further, spring 28 in the absence of a force exerted by electromagnet 7 holds cam 26 in disengagement from rotor 35.

The action of paper-feeding finger 10, pawl 10a, ratchet wheel 13, paper-feeding roller 14, and roller 15 is exactly the same as in the conventional mechanism shown in FIG. 1.

Figure 3:
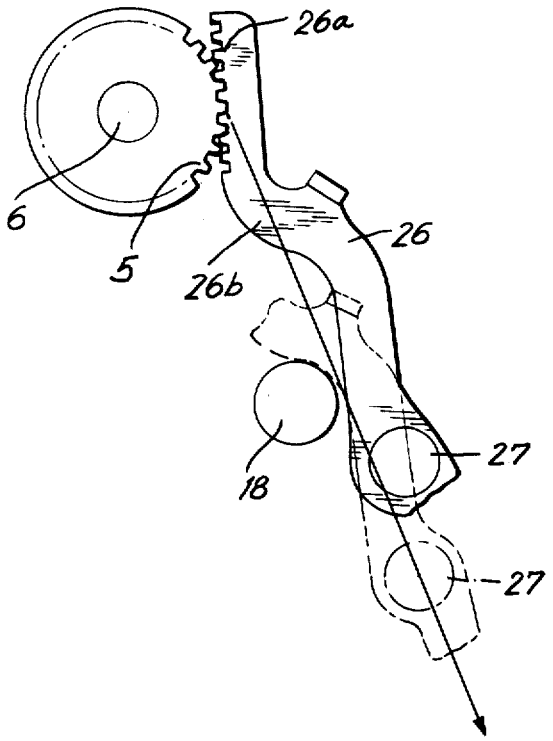
FIG. 3 is a partial view of the same motion-transformer in engaged position.
Figure 4:
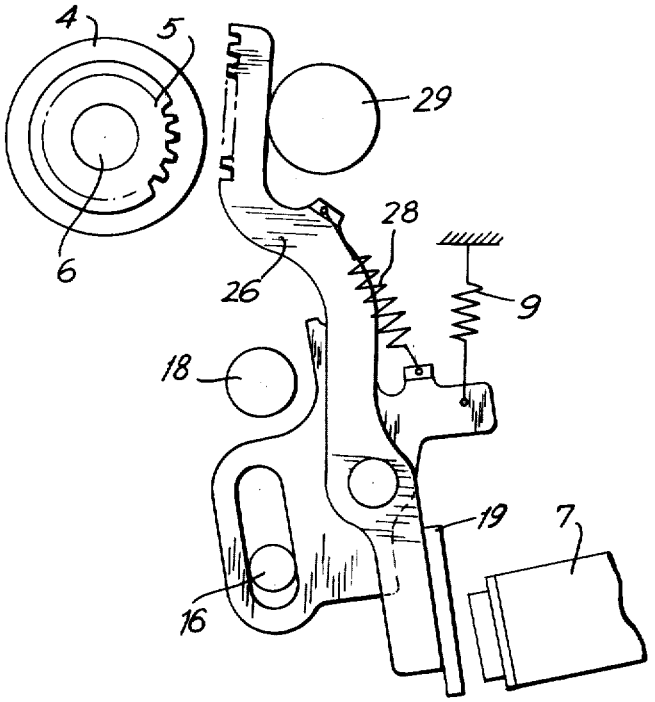
FIG. 4 is a partial view of the same motion-transformer in disengaged position.

The way in which stop 18 acts to disengage end 26a from rotor 35 is shown in FIGS. 3 and 4. In FIG. 3 cam 26 is engaged with rotor 35 and the relationship of camming portion 26b to stop 18 as the two members make contact is shown in phantom in FIG. 3.

The clockwise rotation of cam 26 may be limited by use of stop 8a mounted on reciprocatable member 38. Alternatively, an energy-absorbing damper 29 may be positioned anywhere along cam 26 to stop cam 26 in its clockwise rotation while preventing oscillation.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

What is claimed is:

1. A motion-transforming mechanism comprising a rotor, a reciprocatable member proximate said rotor and movable in first and second directions opposite to each other, first and second stops positioned for guiding and limiting the excursion of said reciprocatable member, a trunion mounted on said reciprocatable member, a cam member mounted pivotably on said trunion, said cam member having a contacting portion engageable with said rotor and having a camming portion, first spring means normally holding said contacting portion disengaged from said rotor, second spring means normally holding said reciprocatable member against said first stop, trigger means for rotating said contacting portion of said cam member into engagement with said rotor by exerting a [ pulsed ] force moment greater than the force moment exerted by said first spring means, said rotor rotating in such a direction that engagement of said contacting portion with said rotor moves said cam member and thereby said trunion and said reciprocatable member toward said second stop, and a guide proximate said cam member, said guide being so positioned that as said reciprocatable member carrying said cam member moves toward said second stop, said camming portion engages said guide, the shape of said camming portion being such that on engaging said guide, said cam member is rotated away from said rotor by movement of said reciprocating member toward said second stop, thereby disengaging said contacting portion [ form ] *from* said rotor [, said trigger means being adapted to terminate exertion of said pulse moment at or shortly after the disengagement of said contacting portion from said rotor thereby ] *and* allowing said second spring means to draw said reciprocating member to said first stop, and said first spring means to hold said contacting portion disengaged from said rotor.

2. A motion-transforming mechanism as defined in claim 1 wherein said rotor is a pinion gear and said contacting portion is a rack.

3. A motion-transforming mechanism as defined in claim 1 wherein said trigger means is a pulsable electromagnet and said cam member comprises a plate affixed to same and so positioned and of said composition as to be movable by the magnetic flux from said electromagnet against the force exerted by said first spring means.

4. A motion-transforming mechanism as defined in claim 1 further comprising a pawl attached to said reciprocatable member and a rotatable ratchet wheel, said pawl, said reciprocatable member and said ratchet wheel being so related that a single excursion of said reciprocatable member toward and away from said second stop rotates said ratchet wheel by an amount corresponding to the distance between successive teeth on said wheel.

5. A motion-transforming mechanism as defined in claim 4 wherein said mechanism is a portion of a small printing machine and said mechanism further comprises a first drum attached to said ratchet wheel for rotation therewith, a second drum mounted for rotation as the result of pressure urging said drums together, said first and second drums serving to receive paper therebetween and to advance said paper positioned with each pulse from said trigger means.

6. A motion-transforming mechanism as defined in claim 3 wherein the shape of said cam member is such that when said electromagnet brings said engaging portion in contact with said rotor clearance remains between said electromagnet and said plate, thereby facilitating movement of said reciprocatable member.

7. A motion-transforming mechanism as defined in claim 1, further comprising a stop of an engery-absorbing material suitably located for halting the rotation of said cam member under the influence of said first spring after disengagement of said cam member from said rotor, thereby preventing oscillation of said cam member.

* * * * *